(12) United States Patent
Nagai et al.

(10) Patent No.: US 12,052,503 B2
(45) Date of Patent: Jul. 30, 2024

(54) CAMERA PARAMETER DERIVATION APPARATUS, CAMERA PARAMETER DERIVATION METHOD, AND CAMERA PARAMETER DERIVATION PROGRAM

(71) Applicant: NIPPON TELEGRAPH AND TELEPHONE CORPORATION, Tokyo (JP)

(72) Inventors: Takasuke Nagai, Musashino (JP); Munekazu Date, Musashino (JP); Shinya Shimizu, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 127 days.

(21) Appl. No.: 17/776,035

(22) PCT Filed: Nov. 25, 2019

(86) PCT No.: PCT/JP2019/045905
§ 371 (c)(1),
(2) Date: May 11, 2022

(87) PCT Pub. No.: WO2021/106027
PCT Pub. Date: Jun. 3, 2021

(65) Prior Publication Data
US 2022/0394183 A1    Dec. 8, 2022

(51) Int. Cl.
*H04N 23/695*  (2023.01)
*G06T 7/73*  (2017.01)

(52) U.S. Cl.
CPC ............. *H04N 23/695* (2023.01); *G06T 7/74* (2017.01)

(58) Field of Classification Search
CPC .. H04N 23/695; H04N 13/239; H04N 13/243; H04N 13/246; H04N 23/90; G06T 7/74; G06T 7/85
See application file for complete search history.

(56) References Cited

U.S. PATENT DOCUMENTS

2018/0108150 A1*  4/2018  Curtis ..................... G06T 7/246

OTHER PUBLICATIONS

Munekazu Date et al., Full paralac table top display with visually equivalent light field 3D, The 23rd Annual Meeting of the Virtual Reality Society of Japan, Sep. 19, 2018.
(Continued)

*Primary Examiner* — Nicholas G Giles
(74) *Attorney, Agent, or Firm* — Harness, Dickey & Pierce, P.L.C.

(57) ABSTRACT

A camera parameter derivation apparatus for deriving camera parameters of a plurality of cameras for which conditions that the cameras be arranged at ideal positions that are set on a straight line at equal intervals and that directions of all arranged cameras be parallel to each other have been set includes an internal parameter derivation unit that derives internal parameter matrices of the cameras based on estimated internal parameter matrices for all cameras that are arranged at estimated positions while being oriented in estimated directions, a camera position derivation unit that derives ideal positions of the cameras that minimize the maximum of the distances between the estimated positions and the ideal positions, and a rotation matrix derivation unit that derives rotation matrices for correcting external parameters such that errors from parallel directions are equal to or less than a threshold value.

6 Claims, 7 Drawing Sheets

(56) References Cited

OTHER PUBLICATIONS

Jiachen Yang et al., A Multi-View Image Rectification algorithm for matrix camera arrangement, Artificial Intelligence Research, vol. 3, No. 1, 2014, pp. 18-29.

* cited by examiner

CAMERA PARAMETER DERIVATION APPARATUS, CAMERA PARAMETER DERIVATION METHOD, AND CAMERA PARAMETER DERIVATION PROGRAM

CROSS-REFERENCE TO RELATED APPLICATIONS

This application is a 371 U.S. National Phase of International Application No. PCT/JP2019/045905, filed on Nov. 25, 2019. The entire disclosure of the above application is incorporated herein by reference.

TECHNICAL FIELD

The present invention relates to a camera parameter derivation apparatus, a camera parameter derivation method, and a camera parameter derivation program.

BACKGROUND ART

Techniques for displaying an image that allows a subject to appear to stand out to the observer include a naked-eye stereoscopic display, a light field display, and the like. Multi-view images generated by photographing a subject with multiple cameras are input to the light field display. The multi-view images of the subject are displayed on the light field display as images of viewpoints, specifically, such that an image incident on the left eye of the observer and an image incident on the right eye of the observer differ from each other. Using the difference between images perceived by the left and right eyes, the light field display can display an image of the subject that appears to stand out to the observer (see NPL 1).

The positions of the left and right eyes of the observer with respect to the position of the light field display and the positions of two cameras with respect to the position of the subject displayed on the light field display have the same positional relationship. Thus, it is necessary to accurately install a plurality of cameras in a predetermined arrangement on the light field display. For example, an arrangement in which all cameras for photographing a subject are installed on a straight line at equal intervals and the directions of all cameras are parallel to each other is predetermined as an ideal arrangement on the light field display disclosed in NPL 1.

However, it is difficult for an operator to install all cameras for photographing a subject in an ideal arrangement. In the actual arrangement work, some of the cameras may not be installed on a straight line at equal intervals. Also, the direction of some of the cameras may not be parallel to the directions of the remaining cameras.

In such cases, images to be projected to the left and right eyes of the observer cannot be reproduced on the light field display with an accurate positional relationship and thus an image that allows the subject to appear three-dimensional to the observer cannot be accurately reproduced.

NPL 2 discloses a technique for correcting multi-view images generated by a plurality of cameras not in an ideal arrangement into multi-view images generated by a plurality of cameras in an ideal arrangement. In NPL 2, camera parameters are derived for cameras in an ideal arrangement in which all cameras for photographing a subject are installed on a straight line at equal intervals and the directions of all cameras are parallel to each other. The multi-view images are corrected based on the derived camera parameters.

CITATION LIST

Non Patent Literature

NPL 1: Munekazu Date, Megumi Isogai, Hideaki Kimata, "Full Parallax Table Top Display Using Visually Equivalent Light Field 3D," Proceedings of the 23rd Annual Conference of the Virtual Reality Society of Japan, Sep. 19-21, 2018, Tohoku University, Japan NPL 2: Jiachen Yang, Fei Guo, Huogen Wang, Zhiyong Ding, "A Multi-View Image Rectification algorithm for matrix camera arrangement," Artificial Intelligence Research, 3(1), (2014): 18-29

SUMMARY OF THE INVENTION

Technical Problem

Thus, when multi-view images are input to the light field display, it is necessary to derive camera parameters for correcting the multi-view images with a certain level of accuracy or higher such that discomfort to an observer is reduced.

In view of the above circumstances, it is an object of the present invention to provide a camera parameter derivation apparatus, a camera parameter derivation method, and a camera parameter derivation program capable of deriving camera parameters for correcting multi-view images with a certain level of accuracy or higher such that discomfort to an observer is reduced, when generating the multi-view images to be displayed on a light field display based on images taken by a plurality of cameras.

Means for Solving the Problem

An aspect of the present invention provides a camera parameter derivation apparatus for deriving camera parameters of a plurality of cameras for which conditions that the cameras be arranged at ideal positions that are set on a straight line at equal intervals and that directions of all arranged cameras be parallel to each other have been set, the camera parameter derivation apparatus including an internal parameter derivation unit configured to derive, based on estimated internal parameter matrices for all cameras that are arranged at estimated positions that possibly have errors from the ideal positions while being oriented in estimated directions that possibly have errors from the parallel directions, internal parameter matrices of the cameras for correcting the estimated internal parameter matrices, a camera position derivation unit configured to derive, based on external parameters of the arranged cameras, the ideal positions of the cameras that minimize a maximum of distances between the estimated positions and the ideal positions of the cameras, and a rotation matrix derivation unit configured to derive, based on the external parameters, rotation matrices for correcting the external parameters such that the errors from the parallel directions are equal to or less than a threshold value.

Effects of the Invention

According to the present invention, it is possible to derive camera parameters for correcting multi-view images with a certain level of accuracy or higher such that discomfort to an observer is reduced, when generating the multi-view images to be displayed on a light field display based on images taken by a plurality of cameras.

DESCRIPTION OF EMBODIMENTS

Embodiments of the present invention will be described in detail with reference to the drawings.

First Embodiment

Figure 1:
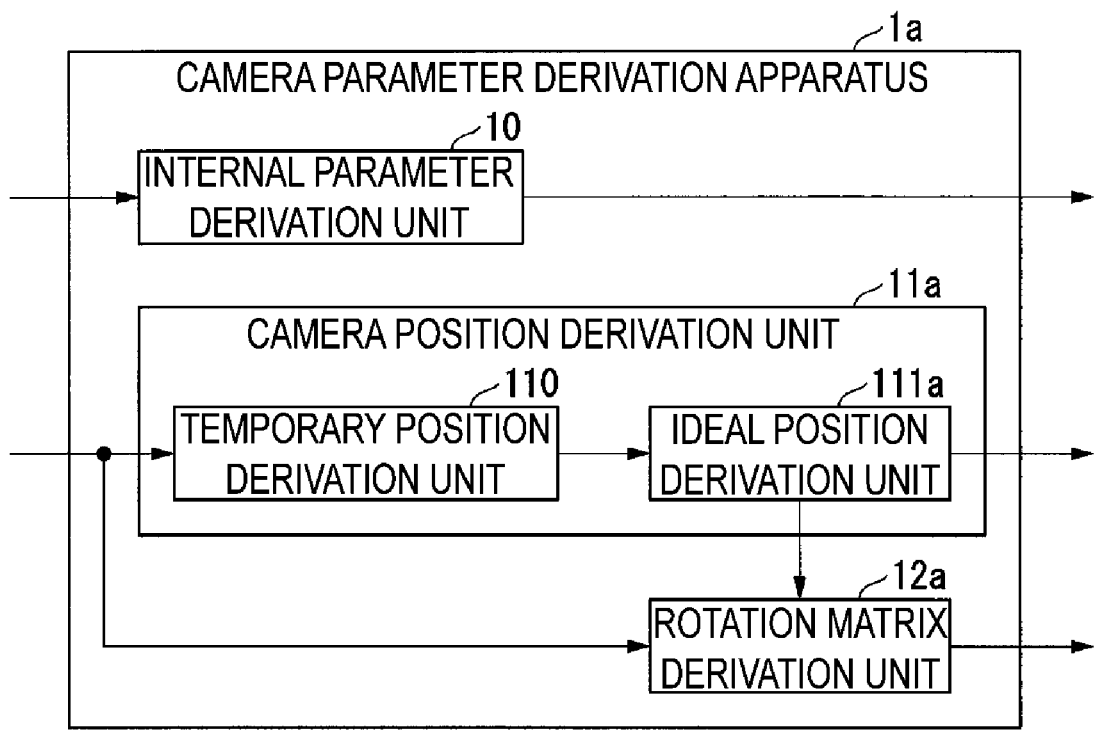
FIG. 1 is a diagram illustrating an exemplary configuration of a camera parameter derivation apparatus according to a first embodiment.

FIG. 1 is a diagram illustrating an exemplary configuration of a camera parameter derivation apparatus $1a$. The camera parameter derivation apparatus $1a$ is an apparatus for deriving camera parameters for a plurality of cameras. The camera parameter derivation apparatus $1a$ derives ideal camera parameters (virtual camera parameters) for correcting multi-view images with a certain level of accuracy or higher such that discomfort to an observer is reduced, when generating the multi-view images to be displayed on a light field display based on images taken by a plurality of cameras. The camera parameter derivation apparatus $1a$ derives ideal internal parameters of each camera, an ideal position of each camera, and an ideal rotation matrix of each camera.

An ideal arrangement is an arrangement that satisfies predetermined conditions. In the following, the predetermined conditions are conditions that all cameras for photographing a subject be installed on a straight line at equal intervals with predetermined accuracy and that the directions of all cameras be parallel to each other with predetermined accuracy.

Camera parameters include external parameters and internal parameters. The external parameters are parameters representing the position and direction (orientation) of the camera, examples of which are parameters representing a translation vector (parallel translation vector) representing the position of the camera and a rotation matrix representing the orientation of the camera. The internal parameters are parameters for converting camera coordinates into image coordinates, examples of which are a parameter representing a focal length, a parameter representing the position of an optical center (principal point), and a parameter representing lens distortion.

The camera parameter derivation apparatus $1a$ includes an internal parameter derivation unit 10, a camera position derivation unit 11a, and a rotation matrix derivation unit 12a. The camera position derivation unit 11a includes a temporary position derivation unit 110 and an ideal position derivation unit 111a.

Figure 2:
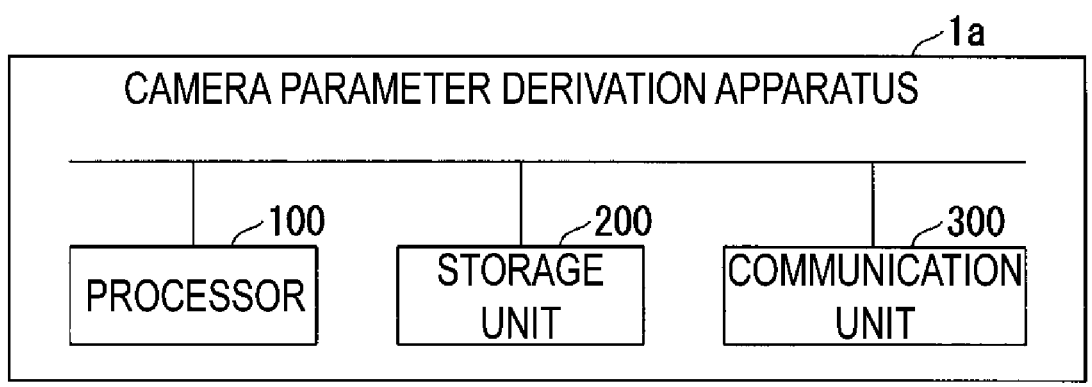
FIG. 2 is a diagram illustrating an exemplary hardware configuration of the camera parameter derivation apparatus according to the first embodiment.

FIG. 2 is a diagram illustrating an exemplary hardware configuration of the camera parameter derivation apparatus $1a$. The camera parameter derivation apparatus $1a$ includes a processor 100, a storage unit 200, and a communication unit 300.

Some or all of the internal parameter derivation unit 10, the camera position derivation unit 11a, and the rotation matrix derivation unit 12a are implemented in software by the processor 100 such as a central processing unit (CPU) executing a program stored in a storage unit 200 having a non-volatile recording medium (non-temporary recording medium). The program may be recorded on a computer-readable recording medium. The computer-readable recording medium is a portable medium such as a flexible disk, a magneto-optical disc, a read only memory (ROM), or a CD-ROM or a non-temporary recording medium such as a storage device such as a hard disk provided in a computer system. The program may be received by the communication unit 300 via a communication line. The storage unit 200 may store the camera parameters of each camera, image data, data tables, and lookup tables.

Some or all of the internal parameter derivation unit 10, the camera position derivation unit 11a, and the rotation matrix derivation unit 12a may be implemented, for example, using hardware including an electrical circuit or circuitry that uses a large scale integration (LSI) circuit, an application specific integrated circuit (ASIC), a programmable logic device (PLD), or a field programmable gate array (FPGA).

Hereinafter, a position estimated as an actual position of a camera is referred to as an "estimated position." An ideal position of a camera is referred to as an "ideal position." A temporary position as an ideal position of a camera is referred to as a "temporary ideal position." A position that serves as a reference for the positions of cameras is referred to as a "reference position." A temporary position as the reference position for cameras is referred to as a "temporary reference position." An ideal distance between adjacent cameras is referred to as an "ideal distance." A temporary distance as the ideal distance between cameras is referred to as a "temporary ideal distance." A vector of the distance between adjacent ideal positions is referred to as an "ideal distance vector." A vector of the distance between adjacent temporary positions is referred to as a "temporary ideal distance vector."

Figure 3:
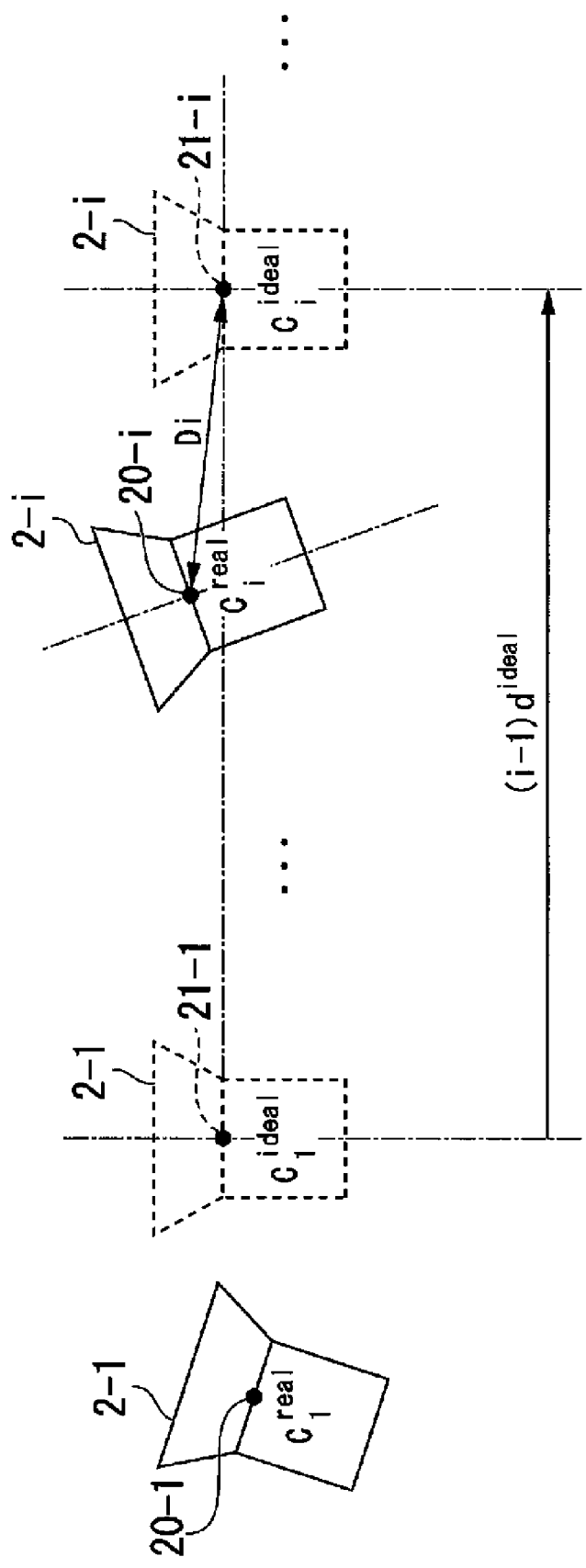
FIG. 3 is a diagram illustrating an exemplary arrangement of a plurality of cameras according to the first embodiment.

FIG. 3 is a diagram illustrating an exemplary arrangement of a plurality of cameras $2\text{-}i$ (where $i=1, \ldots, n$). The positions of the arranged n cameras $2\text{-}i$ "$C_i$" are estimated positions of the cameras. Estimated positions may have errors from ideal positions. The number of cameras $2\text{-}i$ "n" represents the number of viewpoints of multi-view images input to the light field display.

Hereinafter, "$d^{ideal}$" represents the ideal distance vector. "$C_i^{ideal}$" represents the ideal position of each camera $2\text{-}i$. "$C_i^{real}$" represents the estimated position of each camera $2\text{-}i$ "$C_i$." The ideal position of the camera $2\text{-}1$ "$C_1$" is defined as the reference position.

The n cameras $2\text{-}i$ photograph a subject. Each camera $2\text{-}i$ generates a moving image or a still image including an image of a subject (not illustrated). Thus, multi-view images are generated from the images taken by the n cameras $2\text{-}i$. The internal and external parameters of each camera $2\text{-}i$ are estimated in advance, for example, by a calibration method disclosed in Reference 1.

Reference 1: Zhang Zhengyou, "A flexible new technique for camera calibration," IEEE Transactions on Pattern Analysis and Machine Intelligence, 22(11), (2000): 1330-1334.

Referring back to FIG. 1, an outline of the camera parameter derivation apparatus 1a will be described.

The internal parameter derivation unit 10 derives and outputs an ideal internal parameter matrix of each camera 2-i based on the input estimated internal parameters. The temporary position derivation unit 110 derives and outputs a temporary reference position for each camera 2-i based on the input estimated external parameters. The temporary position derivation unit 110 derives and outputs a temporary ideal distance vector for the cameras 2-i based on the input estimated external parameters. The ideal position derivation unit 111a derives an ideal position of each camera 2-i based on the temporary reference position and the temporary ideal distance vector. The ideal position derivation unit 111a derives an ideal distance vector for the n cameras 2-i and outputs the ideal distance vector to the rotation matrix derivation unit 12a. The rotation matrix derivation unit 12a derives an ideal rotation matrix of each camera 2-i based on the estimated external parameters and the ideal distance vector for the n cameras 2-i.

Next, details of the camera parameter derivation apparatus 1a will be described. The internal parameter derivation unit 10 takes internal parameters estimated in previously executed calibration as inputs and derives and outputs an ideal internal parameter matrix. A method by which the internal parameter derivation unit 10 derives the ideal internal parameter matrix is not limited to a specific derivation method.

For example, the internal parameter derivation unit 10 may derive an average of the internal parameter matrices of all cameras 2-i as an ideal internal parameter matrix. For example, the internal parameter derivation unit 10 may derive an average of the internal parameter matrices of all cameras 2-i and derive an internal parameter matrix closest to the average as an ideal internal parameter matrix. For example, the internal parameter derivation unit 10 may derive an internal parameter matrix of a camera 2-i selected from all arranged cameras 2-i as an ideal internal parameter matrix.

The camera position derivation unit 11a acquires external parameters estimated in the previously executed calibration. The camera position derivation unit 11a takes the estimated external parameters as inputs and derives and outputs a reference position "$C_1^{ideal}$" and an ideal distance vector "$d^{ideal}$" between adjacent ideal positions "$C_i^{ideal}$". The camera position derivation unit 11a derives and outputs an ideal position "$C_i^{ideal}$" of each camera 2-i based on the reference position "$C_i^{ideal}$" and the ideal distance vector "$d^{ideal}$" between adjacent ideal positions "$C_i^{ideal}$".

In order for the multi-view images input to the light field display to be corrected with a certain level of accuracy or higher such that discomfort to an observer is reduced, it is desirable that all cameras 2-i be arranged in the same directions at positions that are on a straight line at equal intervals and the distances between the estimated positions and the ideal positions be short. Therefore, the camera position derivation unit 11a derives expression (1) to minimize the maximum of the distances (errors) between the estimated positions and the ideal positions.

[Math. 1]

$$\text{minimize max}\{D_1, D_2, \ldots, D_n\} \quad (1)$$

Here, "$D_i$" represents the distance between the estimated position "$C_i^{real}$" and the ideal position "$C_i^{ideal}$" of each camera 2-i. The distance between the estimated position "$C_i^{real}$" and the ideal position "$C_i^{ideal}$" of each camera 2-i is represented by equation (2).

[Math. 2]

$$D_i = \|C_i^{real} - C_i^{ideal}\|_2 \quad (2)$$

Here, the ideal position "$C_i^{ideal}$" is represented by equation (3) using the ideal distance vector "$d^{ideal}$".

[Math. 3]

$$C_i^{ideal} = C_1^{ideal} + (i-1)d^{ideal} \quad (3)$$

The camera position derivation unit 11a derives the reference position "$C_1^{ideal}$" and the ideal distance vector "$d^{ideal}$" by solving expression (1). A method by which the camera position derivation unit 11a solves expression (1) is not limited to a specific method. The camera position derivation unit 11a may derive the reference position "$C_i^{ideal}$" and the ideal distance vector "$d^{ideal}$," for example, by performing a full search.

Next, a method of deriving the reference position "$C_1^{ideal}$" and the ideal distance vector "$d^{ideal}$" will be described.

The temporary position derivation unit 110 takes the external parameters estimated in the previously executed calibration as inputs, derives a temporary reference position "$C'_1$" and a temporary ideal distance vector "$d'$," and outputs the derived temporary reference position "$C'_1$" and temporary ideal distance vector "$d'$" to the ideal position derivation unit 111a. Here, the temporary position derivation unit 110 derives the temporary reference position "$C'_1$" and the temporary ideal distance vector "$d'$," by solving expression (4) that minimizes the sum of the distances (errors) between the estimated positions "$C_i^{real}$" and the temporary ideal positions "$C'_i$." The temporary position derivation unit 110 outputs the temporary reference position "$C'_1$" and the temporary ideal distance "d" to the ideal position derivation unit 111a.

[Math. 4]

$$\text{minimize} \sum_{i=1}^{n} \|C_i^{real} - C'_i\|_2 \quad (4)$$

Here, "$C'_i$" represents the temporary ideal position of each camera 2-i. "$C'_i$" is represented by equation (5) using the temporary reference position "$C'_1$" and the temporary ideal distance vector "$d'$."

[Math. 5]

$$C'_i = C_1' + (i-1)d' \quad (5)$$

The ideal position derivation unit 111a takes the derived temporary reference position "$C'_1$" and temporary ideal distance vector "d" as inputs and sets them as initial values for expression (1). The ideal position derivation unit 111a derives the reference position "$C_1^{ideal}$" of the camera 2-1 and the ideal distance vector "$d^{ideal}$" by adjusting the temporary reference position "$C'_1$" and the temporary ideal distance vector "d" within a predetermined range and outputs the derived reference position "$C_1^{ideal}$" and ideal distance vector "$d^{ideal}$."

The range of adjustment is not limited to a specific range. For example, the ideal position derivation unit 111a may set the distance from the temporary reference position "$C'_1$" to the closest estimated position "$C_2^{real}$" as an upper limit of the range in which the temporary reference position "$C'_1$" is to be moved. The ideal position derivation unit 111a may also set an average of the distances between adjacent estimated positions "$C_i^{real}$" as a distance to be added or subtracted from the temporary ideal distance vector "d'."

The ideal position derivation unit 111a derives and outputs the ideal position "$C_i^{ideal}$" of each camera 2-$i$ based on the reference position "$C_1^{ideal}$" of the camera 2-1 and the ideal distance vector "$d^{ideal}$" as in equation (2).

The rotation matrix derivation unit 12a acquires the external parameters estimated in the previously executed calibration and takes them as inputs. The rotation matrix derivation unit 12a acquires the ideal distance vector "$d^{ideal}$" for the n cameras 2-$i$ from the ideal position derivation unit 111a. Thereby, the rotation matrix derivation unit 12a can derive ideal rotation matrices for making the directions of all cameras 2-$i$ parallel to each other. Based on the ideal internal parameter matrix, the ideal positions, and the ideal rotation matrices, the images taken by the cameras 2-$i$ are converted into images taken by the cameras 2-$i$ at the ideal positions, thereby generating multi-view images that can be accurately reproduced by the light field display.

A method for deriving the ideal rotation matrix is not limited to a specific method. For example, the rotation matrix derivation unit 12a may use the unit vector of the ideal distance vector as the x component of the ideal rotation matrix. Here, the rotation matrix derivation unit 12a uses the outer product of the z component of a rotation matrix for a camera 2-$i$ selected from the arranged cameras 2-$i$ and the x component of the ideal rotation matrix as the y component of the ideal rotation matrix. The rotation matrix derivation unit 12a may use the outer product of the x component and they component of the ideal rotation matrix as the z component of the ideal rotation matrix.

Next, an exemplary operation of the camera parameter derivation apparatus 1a will be described.

Figure 4:
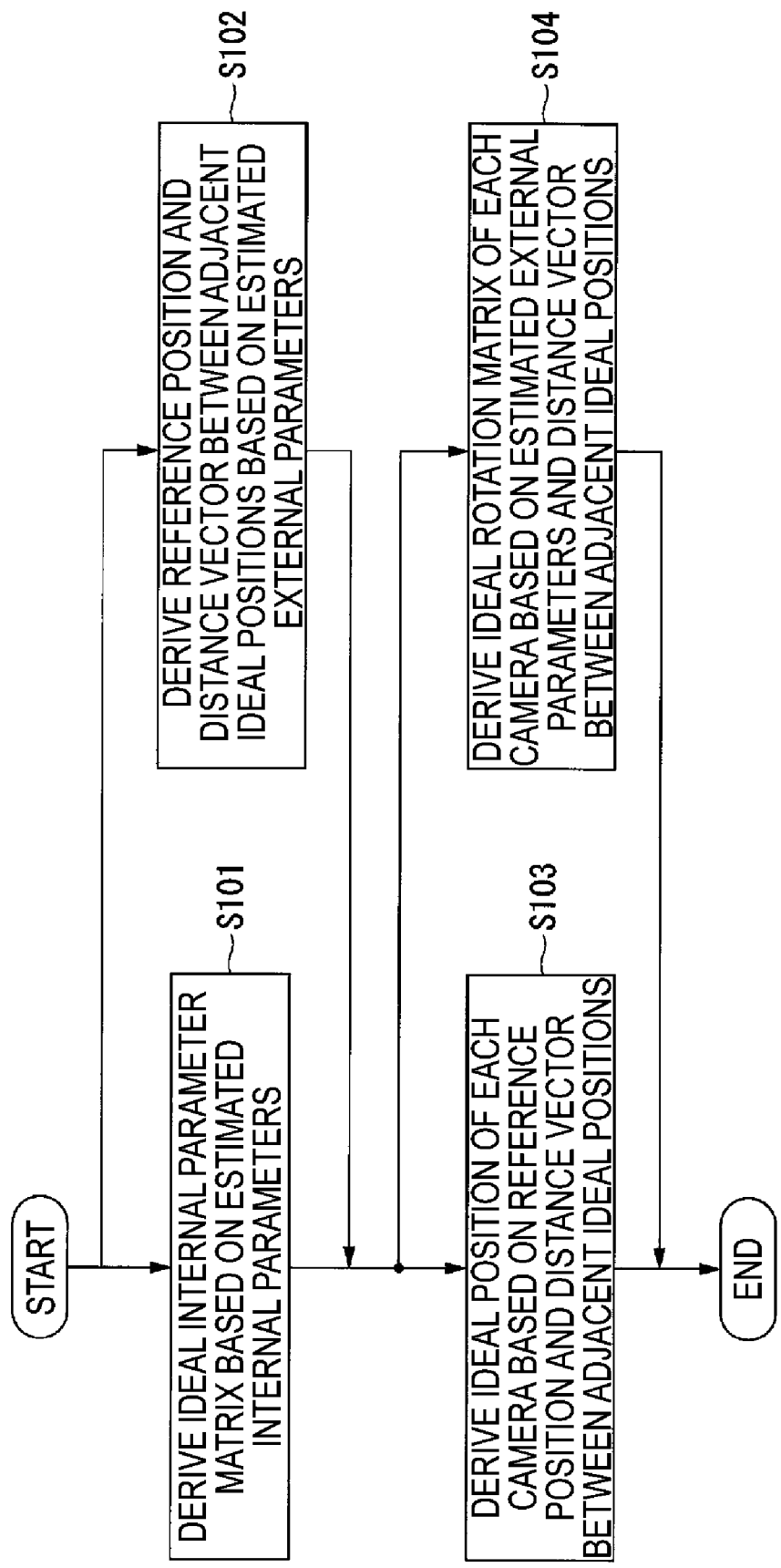
FIG. 4 is a flowchart showing an exemplary operation of the camera parameter derivation apparatus according to the first embodiment.

FIG. 4 is a flowchart showing an exemplary operation of the camera parameter derivation apparatus 1a. The internal parameter derivation unit 10 acquires estimated internal parameters. The internal parameter derivation unit 10 takes the estimated internal parameters as inputs and derives an ideal internal parameter matrix. The internal parameter derivation unit 10 outputs the ideal internal parameter matrix (step S101). Step S101 may be executed after any of steps S102 to S104 has been executed.

The camera position derivation unit 11a acquires estimated external parameters. The camera position derivation unit 11a takes the estimated external parameters as inputs and derives and outputs a reference position "$C_1^{ideal}$" and an ideal distance vector "$d^{ideal}$" between adjacent ideal positions "$C_i^{ideal}$" (step S102).

The camera position derivation unit 11a derives and outputs an ideal position "$C_i^{ideal}$" of each camera 2-$i$ based on the reference position "$C_1^{ideal}$" and the ideal distance vector "$d^{ideal}$" between adjacent ideal positions "$C_i^{ideal}$" (step S103).

The rotation matrix derivation unit 12a acquires the estimated external parameters. The rotation matrix derivation unit 12a acquires the ideal distance vector "$d^{ideal}$" between adjacent ideal positions "$C_i^{ideal}$" from the camera position derivation unit 11a. The rotation matrix derivation unit 12a derives and outputs an ideal rotation matrix of each camera 2-$i$ based on the estimated external parameters and the ideal distance vector "$d^{ideal}$" between adjacent ideal positions "$C_i^{ideal}$" (step S104).

Figure 5:
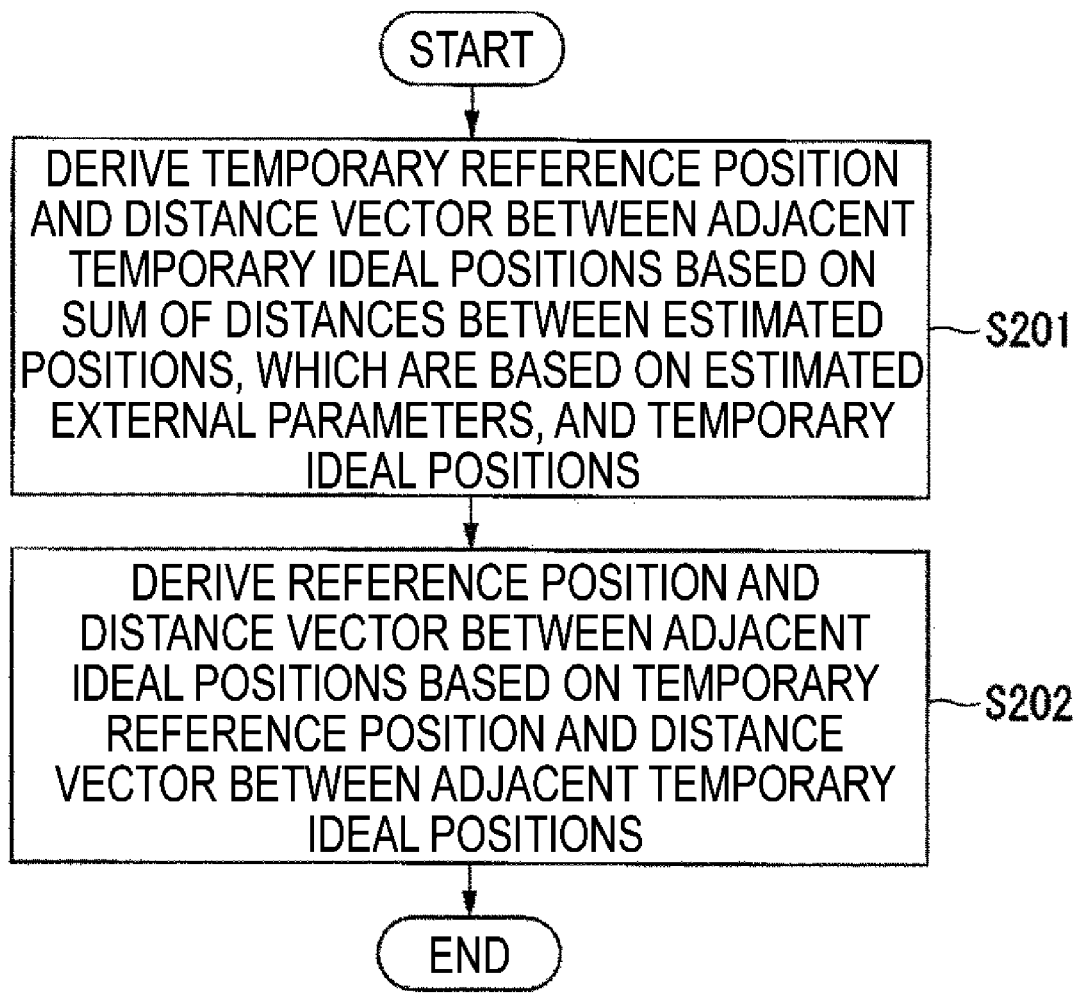
FIG. 5 is a flowchart showing an exemplary operation of deriving a reference position and a distance vector according to the first embodiment.

FIG. 5 is a flowchart showing an exemplary operation of deriving the reference position "$C_1^{ideal}$" and the distance vector "$d^{ideal}$." The temporary position derivation unit 110 acquires the estimated external parameters. The temporary position derivation unit 110 takes the estimated external parameters as inputs and derives the sum of the distances between the estimated positions "$C_i^{real}$" and the temporary ideal positions "$C'_i$." The temporary position derivation unit 110 derives and outputs a temporary reference position "C'1" and a temporary ideal distance vector "d" between adjacent temporary ideal positions based on the sum of the distances between the estimated positions "$C_i^{real}$" and the temporary ideal positions "$C'_i$" (for example, based on expression (4)) (step S201).

The ideal position derivation unit 111a acquires the temporary reference position "$C'_1$" and the ideal distance vector "d" between adjacent temporary ideal positions from the temporary position derivation unit 110. The ideal position derivation unit 111a takes the temporary reference position "$C'_1$" and the temporary ideal distance vector "d" between adjacent temporary ideal positions as inputs and derives a reference position "$C_1^{ideal}$" and an ideal distance vector "$d^{ideal}$" between adjacent ideal positions. The ideal position derivation unit 111a derives an ideal position of each camera 2-$i$ based on the reference position "$C_1^{ideal}$" and the ideal distance vector "$d^{ideal}$" between adjacent ideal positions. The ideal position derivation unit 111a outputs the ideal position of each camera 2-$i$ to an external device (not illustrated). The ideal position derivation unit 111a outputs the ideal distance vector "$d^{ideal}$" between adjacent ideal positions to the rotation matrix derivation unit 12a (step S202).

The camera parameter derivation apparatus 1a derives camera parameters (internal parameter matrices and external parameters) of a plurality of cameras 2-$i$ for which conditions that the cameras 2-$i$ be arranged at ideal positions that are set on a straight line at equal intervals and that the directions of all arranged cameras 2-$i$ be parallel to each other have been set as described above. The cameras 2-1 to 2-$n$ are arranged at estimated positions that may have errors from the ideal positions while being oriented in estimated directions that may have errors from the parallel directions.

Based on estimated internal parameter matrices for all cameras 2-$i$ that are arranged at the estimated positions while being oriented in the estimated directions that may have errors from parallel directions, the internal parameter derivation unit 10 derives internal parameter matrices of the cameras 2-$i$ for correcting the estimated internal parameter matrices.

Based on the external parameters of the arranged cameras 2-$i$, the camera position derivation unit 11a derives ideal positions of the cameras 2-$i$ which minimize the maximum of the distances "$D_i$" between the estimated positions "$C_i^{real}$" and the ideal positions "$C_i^{ideal}$" of the cameras 2-$i$ (for example, expression (1)). The camera position derivation unit 11a may derive a temporary reference position and a distance vector between temporary ideal positions such that the sum of the distances between the estimated positions and the temporary ideal positions is minimized (for example, expression (4)). The camera position derivation unit 11a may derive ideal positions that minimize the maximum of the distances between the estimated positions and the ideal positions by adjusting the temporary reference position and the distance vector between temporary ideal positions. Based on the external parameters, the rotation matrix derivation unit 12a derives rotation matrices for correcting the external parameters such that the errors from the parallel directions are equal to or less than a threshold value. The rotation matrix derivation unit 12a derives rotation matrices based on the external parameters and the distance vector between adjacent ideal positions.

Based on the external parameters of the arranged cameras 2-i, the camera position derivation unit 11a derives and outputs ideal positions of the cameras 2-i that minimize the maximum of the distances between the estimated positions and the ideal positions of the cameras 2-i as described above. Thereby, it is possible to derive camera parameters for correcting multi-view images with a certain level of accuracy or higher such that discomfort to an observer is reduced, when generating the multi-view images to be displayed on a light field display based on images taken by a plurality of cameras. It is also possible to efficiently derive the ideal position of each camera which is one of the camera parameters with a reduced amount of computation.

Second Embodiment

A second embodiment differs from the first embodiment in that a rotation matrix derivation unit derives ideal rotation matrices based only on external parameters. In the second embodiment, differences from the first embodiment will be mainly described.

Figure 6:
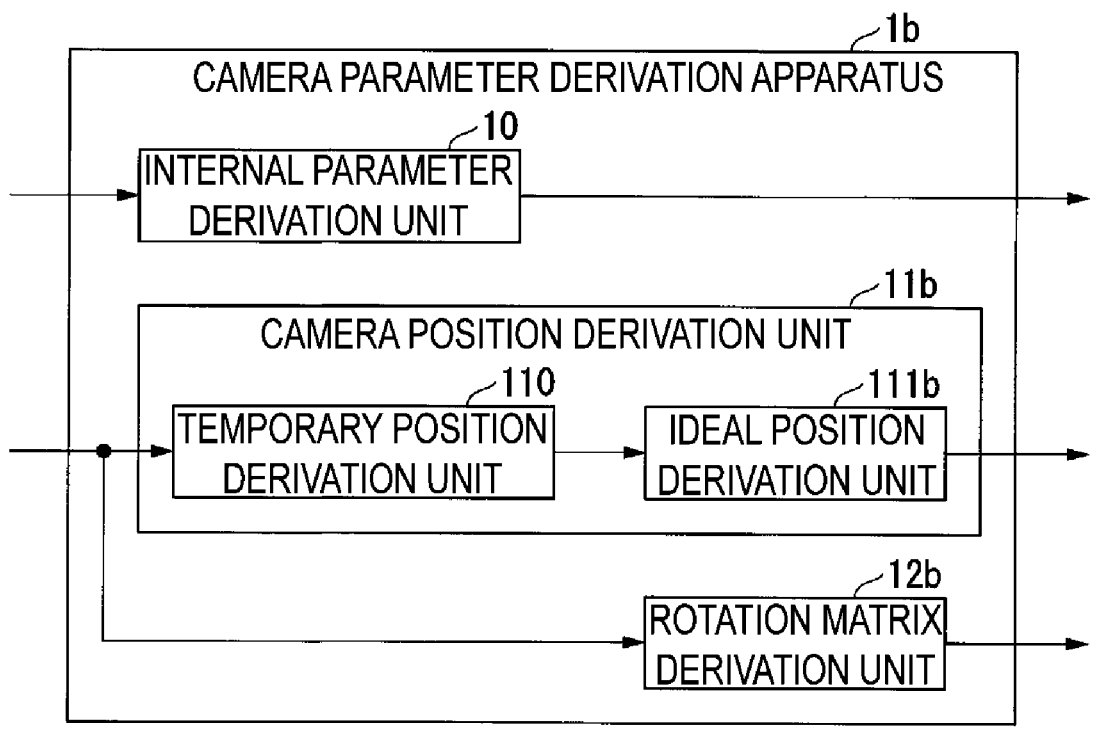
FIG. 6 is a diagram illustrating an exemplary configuration of a camera parameter derivation apparatus according to a second embodiment.

FIG. 6 is a diagram illustrating an exemplary configuration of a camera parameter derivation apparatus 1b. The camera parameter derivation apparatus 1b includes an internal parameter derivation unit 10, a camera position derivation unit 11b, and a rotation matrix derivation unit 12b. The camera position derivation unit 11b includes a temporary position derivation unit 110 and an ideal position derivation unit 111b.

The ideal position derivation unit 111b acquires a temporary reference position "C'$_i$" and a distance vector "d" between adjacent temporary ideal positions from the temporary position derivation unit 110. The ideal position derivation unit 111b takes the temporary reference position "C'$_1$" and the distance vector "d" between adjacent temporary ideal positions (for example, those of equation (5)) as inputs and derives a reference position "$C_1^{ideal}$" and a distance vector "$d^{ideal}$" between adjacent ideal positions. The ideal position derivation unit 111b derives an ideal position of each camera 2-i based on the reference position "$C_i^{ideal}$" and the distance vector "$d^{ideal}$" between adjacent ideal positions. The ideal position derivation unit 111b outputs the ideal position of each camera 2-i to an external device (not illustrated).

The rotation matrix derivation unit 12b acquires external parameters estimated in previously executed calibration. The rotation matrix derivation unit 12b takes the estimated external parameters as inputs and derives an ideal rotation matrix of each camera 2-i. The rotation matrix derivation unit 12a outputs ideal rotation matrices for making the directions of all cameras 2-i parallel to each other to an external device (not illustrated). A method by which the rotation matrix derivation unit 12b derives the ideal rotation matrices is not limited to a specific method. For example, the rotation matrix derivation unit 12b may derive an average of the rotation matrices of the cameras as an ideal rotation matrix.

Next, an exemplary operation of the camera parameter derivation apparatus 1b will be described.

Figure 7:
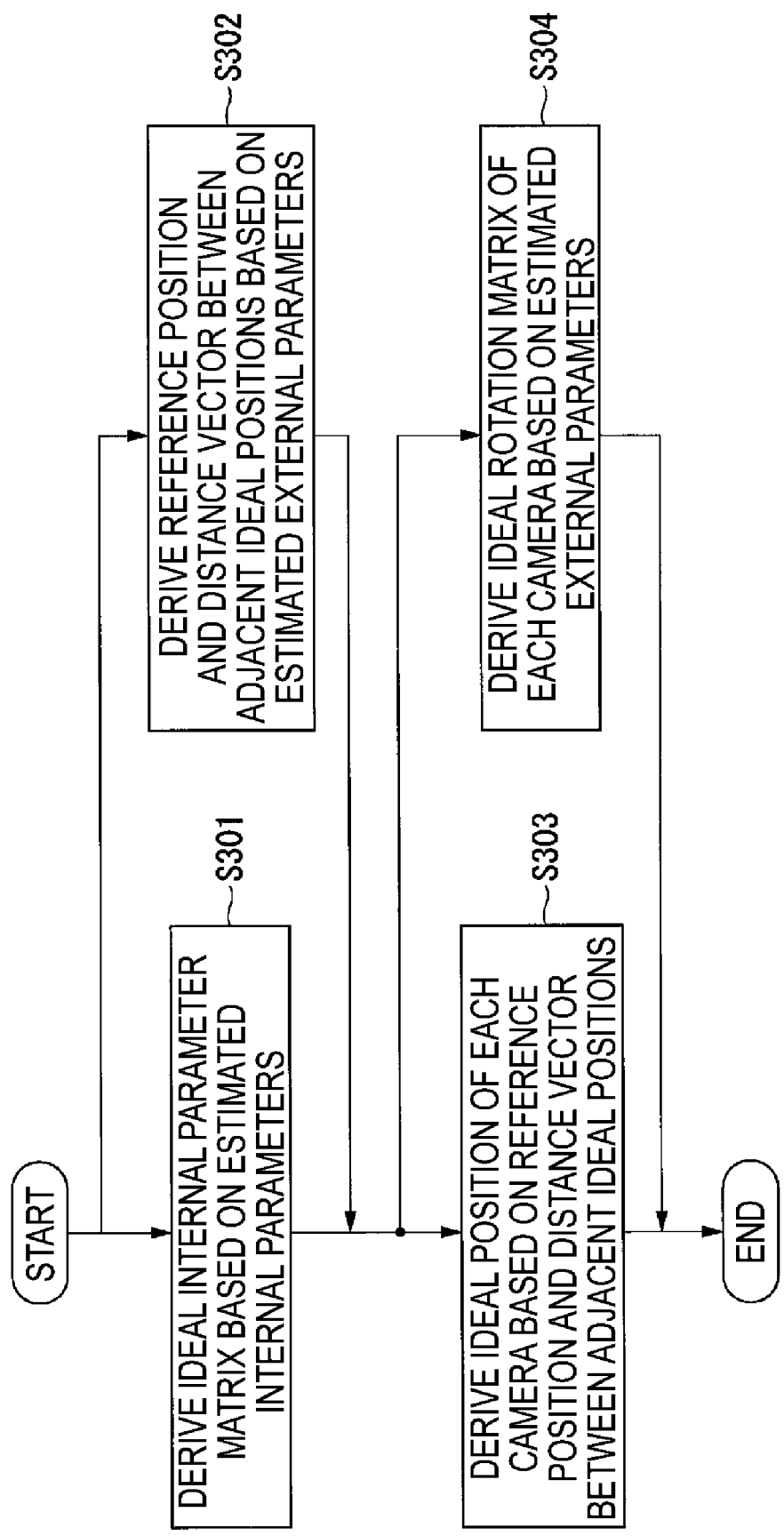
FIG. 7 is a flowchart showing an exemplary operation of the camera parameter derivation apparatus according to the second embodiment.

FIG. 7 is a flowchart showing an exemplary operation of the camera parameter derivation apparatus 1b. Steps S301 to S303 are the same as steps S101 to S103 shown in FIG. 4.

The rotation matrix derivation unit 12b acquires estimated external parameters. The rotation matrix derivation unit 12b takes the estimated external parameters as inputs and derives and outputs ideal rotation matrices of the cameras 2-i for making the directions of all cameras 2-i parallel to each other (step S304). The execution order of steps S301 and S302 does not matter in deriving the ideal rotation matrices in step S304.

In the camera parameter derivation apparatus 1b, the rotation matrix derivation unit 12b derives the rotation matrices based on the external parameters as described above. Thereby, it is possible to derive camera parameters for correcting multi-view images such that discomfort to an observer is reduced, when generating the multi-view images to be displayed on a light field display based on images taken by a plurality of cameras.

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The present invention can be applied to an image processing apparatus that derives camera parameters for correcting multi-view images displayed on a light field display or the like.

REFERENCE SIGNS LIST 1a, 1b Camera parameter derivation apparatus
2 Camera
10 Internal parameter derivation unit
11a, 11b Camera position derivation unit
12a, 12b Rotation matrix derivation unit
20 Estimated position
21 Ideal position
100 Processor
110 Temporary position derivation unit
111a, 111b Ideal position derivation unit
200 Storage unit
300 Communication unit

The invention claimed is:
1. A camera parameter derivation apparatus for deriving camera parameters of a plurality of cameras for which conditions that the cameras be arranged at ideal positions that are set on a straight line at equal intervals and that directions of all arranged cameras be parallel to each other have been set, the camera parameter derivation apparatus comprising:
  a processor; and
  a storage medium having computer program instructions stored thereon, when executed by the processor, perform to:
  derive, based on estimated internal parameter matrices for all cameras that are arranged at estimated positions that possibly have errors from the ideal positions while being oriented in estimated directions that possibly have errors from the parallel directions, internal parameter matrices of the cameras for correcting the estimated internal parameter matrices;

derive, based on external parameters of the arranged cameras, the ideal positions of the cameras that minimize a maximum of distances between the estimated positions and the ideal positions of the cameras; and derive, based on the external parameters, rotation matrices for correcting the external parameters such that the errors from the parallel directions are equal to or less than a threshold value.

2. The camera parameter derivation apparatus according to claim 1, wherein the computer program instructions further perform to derive a temporary reference position and a distance vector between the adjacent temporary ideal positions such that a sum of distances between the estimated positions and the temporary ideal positions is minimized and to derive the ideal positions that minimize the maximum by adjusting the temporary reference position and the distance vector between the adjacent temporary ideal positions.

3. The camera parameter derivation apparatus according to claim 1, wherein the computer program instructions further perform to derive the rotation matrices based on external parameters and a distance vector between adjacent ideal positions.

4. A camera parameter derivation method performed by a camera parameter derivation apparatus for deriving camera parameters of a plurality of cameras for which conditions that the cameras be arranged at ideal positions that are set on a straight line at equal intervals and that directions of all arranged cameras be parallel to each other have been set, the camera parameter derivation method comprising:

deriving, based on estimated internal parameter matrices for all cameras that are arranged at estimated positions that possibly have errors from the ideal positions while being oriented in estimated directions that possibly have errors from the parallel directions, internal parameter matrices of the cameras for correcting the estimated internal parameter matrices;

deriving, based on external parameters of the arranged cameras, the ideal positions of the cameras that minimize a maximum of distances between the estimated positions and the ideal positions of the cameras; and deriving, based on the external parameters, rotation matrices for correcting the external parameters such that the errors from the parallel directions are equal to or less than a threshold value.

5. The method according to claim 4 further comprises deriving a temporary reference position and a distance vector between adjacent temporary ideal positions such that a sum of distances between the estimated positions and the temporary ideal positions is minimized and to derive the ideal positions that minimize the maximum by adjusting the temporary reference position and the distance vector between the adjacent temporary ideal positions.

6. The method according to claim 4 further comprises deriving the rotation matrices based on the external parameters and a distance vector between adjacent ideal positions.

* * * * *